US010227034B2

(12) United States Patent
Litke et al.

(10) Patent No.: US 10,227,034 B2
(45) Date of Patent: Mar. 12, 2019

(54) INTEGRATED LIGHTING

(71) Applicant: Emergency Technology, Inc., Hudsonville, MI (US)

(72) Inventors: Mark Litke, Hudsonville, MI (US); Douglas V. Baker, Middleville, MI (US); Scott Doenges, Hudsonville, MI (US); Randall Scott Karel, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 0 days.

(21) Appl. No.: 15/705,569

(22) Filed: Sep. 15, 2017

(65) Prior Publication Data

US 2018/0079353 A1    Mar. 22, 2018

Related U.S. Application Data

(60) Provisional application No. 62/395,800, filed on Sep. 16, 2016.

(51) Int. Cl.
| | |
|---|---|
| *B60Q 1/26* | (2006.01) |
| *B60Q 1/28* | (2006.01) |
| *B60Q 3/252* | (2017.01) |
| *B60Q 3/88* | (2017.01) |
| *B60Q 3/74* | (2017.01) |
| *B60Q 3/78* | (2017.01) |
| *B60Q 3/80* | (2017.01) |
| *B60Q 3/51* | (2017.01) |
| *B32B 17/10* | (2006.01) |
| *B60Q 1/50* | (2006.01) |
| *B60Q 1/52* | (2006.01) |

(52) U.S. Cl.
CPC ........ *B60Q 1/268* (2013.01); *B32B 17/10541* (2013.01); *B60Q 1/263* (2013.01); *B60Q 1/2615* (2013.01); *B60Q 1/28* (2013.01); *B60Q 1/50* (2013.01); *B60Q 1/52* (2013.01); *B60Q 3/252* (2017.02); *B60Q 3/51* (2017.02); *B60Q 3/74* (2017.02); *B60Q 3/78* (2017.02); *B60Q 3/80* (2017.02); *B60Q 3/88* (2017.02)

(58) Field of Classification Search
CPC .................................. B60Q 1/26; B60Q 1/00
USPC ......................................... 362/488, 487, 459
See application file for complete search history.

(56) References Cited

U.S. PATENT DOCUMENTS

| | | |
|---|---|---|
| 3,385,989 A | 5/1968 | Vogelpohl |
| 4,114,789 A | 9/1978 | Blaylock et al. |
| 4,981,363 A | 1/1991 | Lipman |

(Continued)

OTHER PUBLICATIONS

Ford Fleet, Police & Special Services Vehicles 2017 Brochure, North American Fleet, Lease & Remarketing Operations, published 2016, www.ford.com/fordpoliceinterceptor.

(Continued)

*Primary Examiner* — Edwyn Labaze
(74) *Attorney, Agent, or Firm* — Warner Norcross + Judd LLP

(57) ABSTRACT

A lighting system for specialty lighting, which may be attached to a motor vehicle with a window (e.g., glass, plastic, etc.) that is light transmissive. The lighting system may include one or more light assemblies attached to the window in an interior of the vehicle or an exterior area of the vehicle. In one embodiment, a light assembly may be internal to the window.

9 Claims, 10 Drawing Sheets

(56) References Cited

U.S. PATENT DOCUMENTS

| | | | |
|---|---|---|---|
| 6,000,811 A | 12/1999 | Bordak | |
| 6,202,976 B1 | 3/2001 | Johnson et al. | |
| 6,968,736 B2 | 11/2005 | Lynam | |
| 7,036,965 B2 | 5/2006 | Dalton, Jr. et al. | |
| 8,508,384 B2 | 8/2013 | Uken et al. | |
| 2001/0024371 A1 | 9/2001 | Pastrick et al. | |
| 2002/0159270 A1* | 10/2002 | Lynam | B60K 35/00 362/492 |
| 2004/0109313 A1 | 6/2004 | Smith | |
| 2010/0230566 A1 | 9/2010 | Neufeglise | |
| 2012/0287662 A1* | 11/2012 | Herberholt | B60Q 1/2615 362/542 |
| 2013/0088884 A1* | 4/2013 | Brummel | B60R 1/04 362/494 |
| 2015/0334354 A1 | 11/2015 | Uken et al. | |
| 2017/0341563 A1* | 11/2017 | Kossoff | F21S 45/47 |

OTHER PUBLICATIONS

Interior Warning Dash Light demonstrated at https://youtube.com/watch?v=w8pO1Lu8IFg, published Aug. 16, 2013.
Prior art configurations (6) publicly known at least as early as Sep. 16, 2016.

* cited by examiner

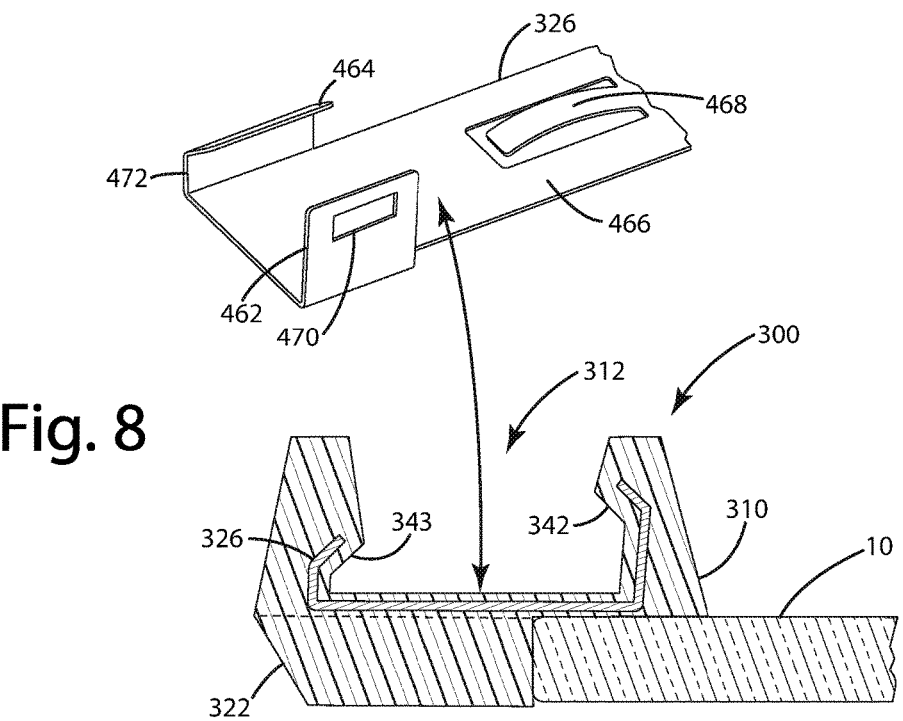
Fig. 8
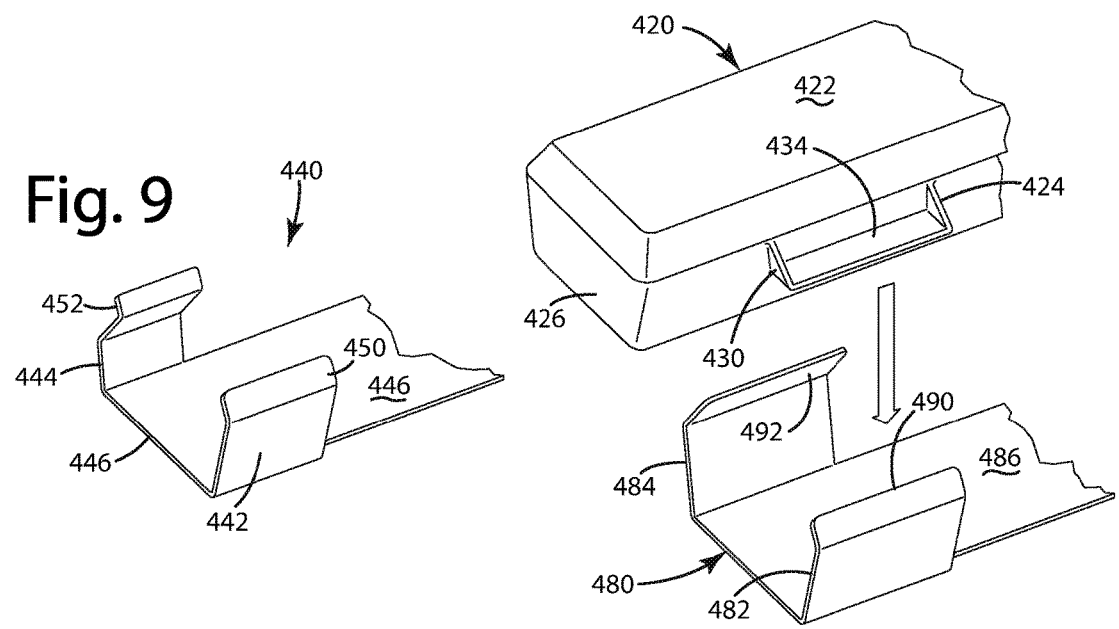
Fig. 9
Fig. 10

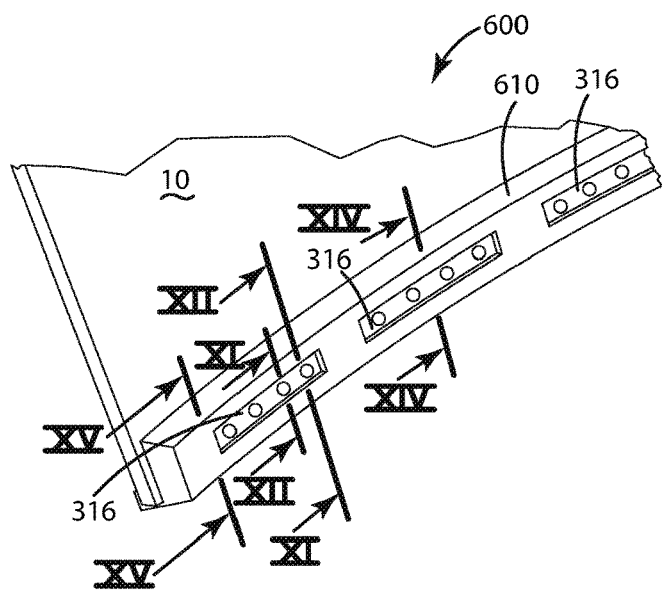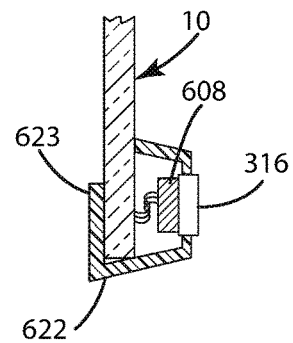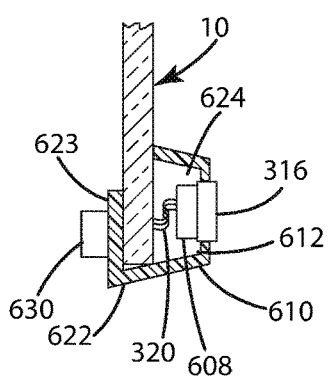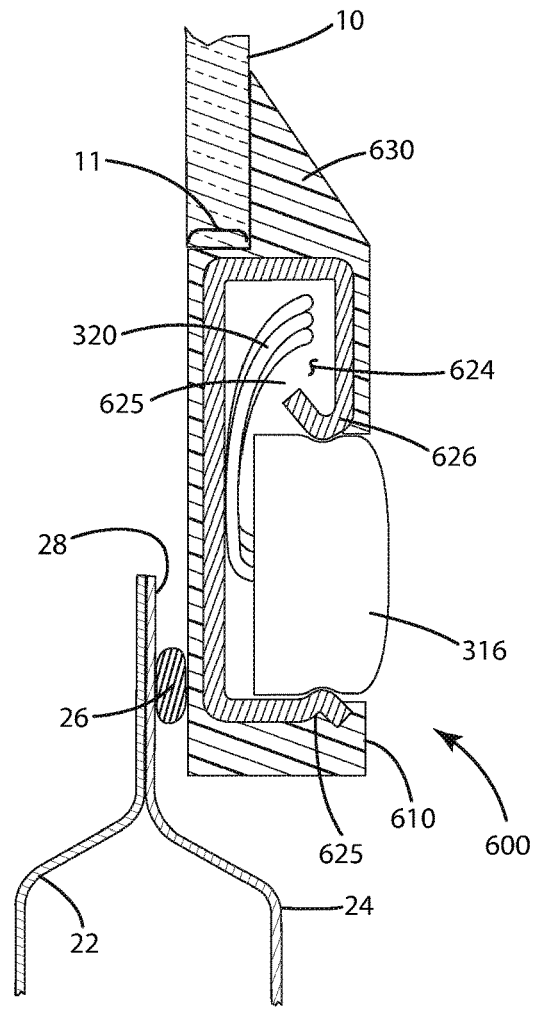
Fig. 13
Fig. 14
Fig. 15
Fig. 16

INTEGRATED LIGHTING

TECHNICAL FIELD

The present application relates to lighting, and more particularly to specialty lighting that may be disposed on a motor vehicle.

BACKGROUND

Many specialty vehicles are fitted with conventional lighting assemblies for a variety reasons—although the principal reason in many cases is signaling. For instance, in the context of a specialty vehicle for police also known as a police vehicle, conventional lighting assemblies may be incorporated in both the exterior and interior of the vehicle to provide signaling capabilities.

While in an inactivated state, external lights may be more easily seen than internal lights by an observer. As a result, many times, efforts have been made to incorporate lights into the vehicle cabin to make the police vehicle less conspicuous. In these cases, consideration is often provided for placement of the lighting assembly to enhance safety or avoid unnecessary distraction. For instance, the lighting assembly may be positioned to substantially avoid an impact zone or to prevent a substantial amount of light from being directed into the vehicle cabin.

Specialty vehicles are often not owned outright and are instead leased for a specialty purpose for a period of time. However, the leased vehicle is typically not configured for the specialty purpose. Modifications are made to the leased vehicle so that it can perform according to the specialty purpose, such as a police vehicle. These modifications can physically alter the leased vehicle, meaning that, at the end of the lease, repair efforts must be made to substantially return the vehicle to its original state at the time of lease (if called for in the lease agreement).

In some instances, there is a preference for use of internal lights over external lights. Installation of internal lights can avoid routing of wire from within a vehicle cabin to an exterior of the vehicle cabin. Wiring for an internal light may be routed within the vehicle cabin, whereas wiring for an external light may utilize a hole through the forward firewall of the vehicle cabin. Such a hole would likely need to be filled or sealed after removal of the external light at the end of the lease period for the vehicle.

SUMMARY

The present application relates to a lighting system for specialty lighting, which may be attached to a motor vehicle with a window (e.g., glass, plastic, etc.) that is light transmissive. The lighting system may include one or more light assemblies attached to the window in an interior of the vehicle or an exterior area of the vehicle. In one embodiment, a light assembly may be internal to the window.

In one embodiment, a lighting system is provided for mounting a light assembly to a window of a vehicle. The lighting system may include a lighting attachment separable from the light assembly, where the lighting attachment includes an attachment surface constructed to substantially bond to the window in conjunction with an adhesive. The lighting attachment may include a light assembly interface that removably connects with said light assembly in an interior of the vehicle. The light assembly may be configured to removably connect with the light assembly interface of the lighting attachment, where the light assembly includes a light element that generates light in response to application of power to the light element. The light assembly may include a shroud that substantially shields the interior of the vehicle from light output from the light element.

In another embodiment, an exterior light attachment assembly is provided for securing a light assembly to a window of a vehicle. The light assembly may include wiring constructed to receive power from a vehicle power source. The exterior light attachment assembly may include a light carrier, an exterior window interface and an arm that may extend over at least a portion of a thickness of the window. The light carrier may be configured to releasably hold a light assembly in a fixed position exterior to the window, where the light carrier includes a routing path for the wiring of the light assembly, and wherein the routing path is disposed at least in part in the arm. The exterior window interface may be capable of bonding to the exterior surface of the window in conjunction with a bonding agent.

In yet another embodiment, a vehicle window for a vehicle may be provided with an interior layer, an exterior layer, a light element, and an optical barrier or mask. The interior inner layer may be made of light transmissive material arranged to provide an interior surface of the vehicle, and the exterior layer may be made of light transmissive material arranged to provide an exterior surface of the vehicle. The light element may be disposed between the interior layer and the exterior layer, where the light element is configured to emit light toward the outer layer to an exterior space of the vehicle. The optical barrier may be arranged in relation to the light element to block at least a portion of the light emitted from the light element, where the optical barrier includes an aperture to allow transmission of the light to the exterior space of the vehicle.

BRIEF DESCRIPTION OF THE DRAWINGS

FIG. 8 shows a bracket and a cross-sectional view of the lighting system in accordance with one embodiment.

FIG. 9 shows a bracket for a lighting system in accordance with one embodiment.

FIG. 10 depicts a perspective view of a bracket or internal support for a light carrier and a light assembly for a lighting system in accordance with one embodiment.

FIG. 13 shows a perspective view of an exterior window mounted lighting system in accordance with one embodiment.

FIG. 14 depicts a cross-sectional view of the lighting system in FIG. 13.

FIG. 15 depicts a cross-sectional view of the lighting system in FIG. 13.

FIG. 16 shows a cross-sectional view of the lighting system in FIG. 13.

DESCRIPTION

Figure 1:
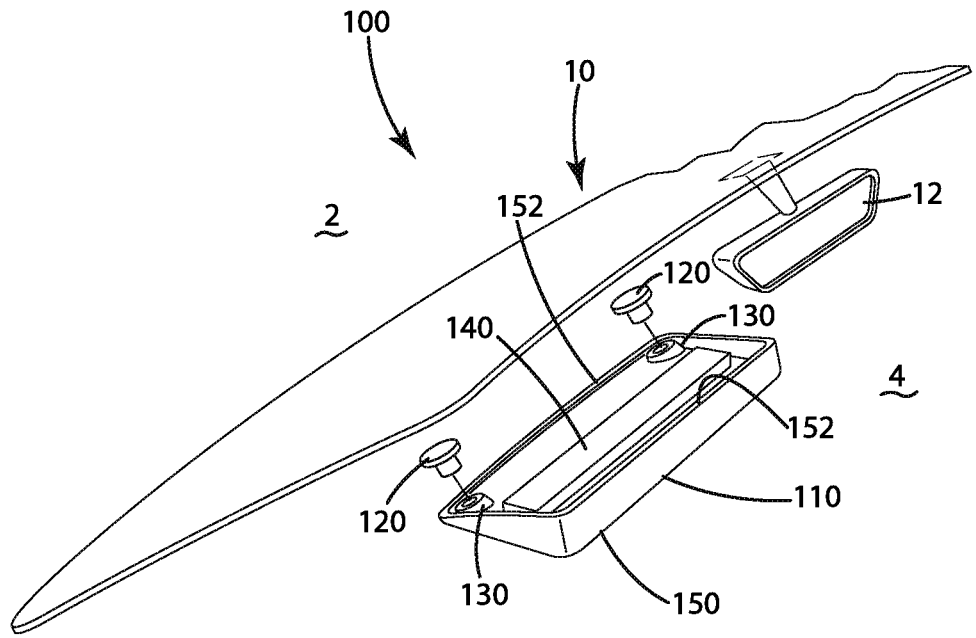
FIG. 1 shows a perspective view of a lighting system according to one embodiment.

A lighting system in accordance with one or more embodiments is described herein. The lighting system may provide specialty lighting, which may be attached to a motor vehicle with a window (e.g., glass, plastic, etc.) that is light transmissive, such as transparent or translucent. The lighting system may be integrated with the motor vehicle according to one or more methods. In one embodiment, the lighting system may be provided with electrical and signal connectivity for a motor vehicle with potential advantages over conventional integration methods.

Specialty vehicle examples may include police vehicles, emergency responder vehicles, school buses, transit buses, fire equipment, sanitation equipment, rail equipment, and highway and transportation support equipment. It should also be understood that the present disclosure is not limited to integrated lighting configurations for specialty vehicles, and that the constructions and methods disclosed herein may be utilized in connection with any window in a motor vehicle or in window applications outside the field of motor vehicles.

In one embodiment, signal lighting may be integrated into a specialty vehicle, such as an emergency vehicle. The arrangement of lighting may involve attention to regulated supply power from the vehicle's electrical system, to controlling signal lines for light mode control, as well as enhancing safe attachment and thermal management from the heat generated by the light itself.

In the case of interior lighting arrangements, the lighting system may be configured to substantially avoid safety zones like air bag deployment zones. This may include both the location of the light and the corresponding electrical wiring location. The lighting system in one embodiment may be arranged to enhance protection of the driver from high brightness lighting, so as to avoid substantially distracting him or her by the light energy which reflects, refracts, or otherwise reenters the driver's location in the vehicle.

The lighting system in accordance with one embodiment may involve mounting of lighting, which most often includes a multitude of lighting segments, by making modification to the vehicle or window, or both, such as drilling holes for electrical wiring connections and mounting fasteners. Additionally, or alternatively, the lighting system according to one embodiment may enable avoidance of modifications utilized in conventional systems.

One or more embodiments of the present disclosure involve integrating lighting into, on, or in proximity to the vehicle glass or window, and may include one or more of the following:

4) interior mounted lights, positioned for light to be primarily viewed exterior to the driver and passenger compartment(s);

5) exterior mounted lights, positioned for light to be primarily viewed exterior to the driver and passenger compartment(s); and 6) lighting positioned within the layers of a window, such as a windshield, rear glass, or side glass, or a combination thereof, of a vehicle.

One or more embodiments according to the present disclosure may provide at least one of the following: mechanical attachment, removable lighting, substantial compliance with environmental operational conditions, enablement of lower or lowest profile light, minimization or reduction in any headliner and vehicle structure dependency, independence from vehicle geometry, and utilization of design and fabrication technology that facilitates partnership with a lighting company and glass manufacturer.

A vehicle according one embodiment, such as an emergency vehicle, may be purposed to keep lighting equipment concealed and generally non-conspicuous. In an effort to achieve this goal, lighting may be placed inside the passenger cabin of the vehicle. This may be accomplished by implementing a lighting configuration according to one or more of the embodiments described herein, including, for example, embodiments 1 and 3 identified above.

The lighting system in one embodiment may provide lighting elements that emit light, steady on or strobing, in a specialty vehicle with minimal to no stray light return (reflection, refraction). This configuration may significantly enhance the safety of vehicle operation. To achieve reduction in stray light return, a shroud may be incorporated into the lighting system that encompasses the light element (in conjunction with the window) and facilitates generation of a wedge shaped 'light funnel'. This configuration may produce a seal against the non-perpendicular vehicle window (e.g., glass), while allowing light output to direct in a controlled horizontal path.

Mounting of the light assembly in one embodiment may involve one or more lighting attachments bonded to a vehicle window and configured to removably connect to the lighting assembly. In this way, use of conventional suction cups for attachment to the vehicle window may be avoided. Additionally, or alternatively, the one or more lighting attachments may avoid installation of a bracket attachment system to vehicle structure underneath the interior trim headliner.

The lighting system in one embodiment may be configured to substantially avoid interference with defined safety zones for airbags, head impacts, and so on in the event of a collision. Thus, the lighting system may provide a low profile system that enhances safety, without substantially reducing the effectiveness of the one or more lighting attachments.

The lighting system in one embodiment may be robustly mounted, sealed against the glass, and provide a low profile as stated above. The lighting system also may be removable for service or end of lease of the vehicle, with little to no damage to the original vehicle aesthetics. The lights and corresponding shrouds of the lighting system may be vehicle specific to adequately remain small in profile while sealing against different glass contours of different vehicle models. Power and signal electrical wiring may be routed to substantially avoid key safety wiring, such as air bag activations. Power and signal electrical wiring routing options have become few with the later model vehicle incorporation of high tensile safety steel used around the door and window openings—the lighting system according to one or more embodiments herein may mitigate against these fewer options by providing alternative wire routing options other than placing a hole in tensile safety steel.

One embodiment of the present disclosure may provide an integrated, finished look so that added lighting and signaling in the lighting system looks as if it were built in at the vehicle factory. This configuration may enhance the appeal for many customers of emergency vehicles (fleet owners & specifiers, municipal departments and corresponding fleets, etc.). In many instances, the major vehicle manufacturers may adopt lighting design according to one embodiment that looks more of a styled and integrated appearance over the historical "bolt on" or appearance of non-factory looking screws, bolts, and fasteners attaching auxiliary equipment.

Overall safety of both driver and other vehicles around the driver may be enhanced according to one or more embodiments of the present disclosure. For instance, the lighting system may incorporate a light element disposed within the vehicle cabin at a zone other than a significant impact zone. Additionally, or alternatively, the lighting system may incorporate a shield or shroud, or both, that substantially directs light away from the vehicle cabin to avoid distracting an operator of the vehicle.

The window may be any type of window, including an articulated or non-articulated window. It should be understood that examples shown for a stationary (non-articulated) window can be adapted for movable (articulated) window applications.

In the context of a vehicle and a physical mounting location thereon, it should be understood that the lighting system may include lighting a) attached or incorporated into a window for external viewing of light and/or b) controlled internal vehicle compartment illumination needs. Internal vehicle lighting may provide passenger illumination that may include white light or red light at controllable illumination levels, and similar vehicle cargo compartments.

Although described primarily in connection with coupling to a window, the lighting system in one embodiment may additionally or alternatively attach to one or more other components of a vehicle, including metal components of the vehicles, such as fenders, bumpers, roof, hoods, interior trim panels, and each with many custom metal brackets.

A specialty purpose vehicle in one embodiment may be ordered from a vehicle manufacturer, and then taken to an upfitter company that disassembles and/or retrofits a portion of the vehicle to add lighting, sirens, and other equipment in accordance with one embodiment. While modifications are accepted for many specialty vehicles, one embodiment according to the present disclosure includes a more cost effective and/or efficient approach that provides more fully integrated and incorporated options directly from the vehicle manufacturer. The end customer may be utilize one stop shopping (not coordinating with a separate upfit), one common warranty, support & service, etc. It should be understood that the present disclosure is not limited to configurations that cutout the upfitter. Other special purpose vehicle options may still involve separate upfit, and many applications of intentional vehicle conspicuity may benefit from the traditional upfit look and performance.

4. Interior Light Assembly or Interior Attachment

Figure 2:
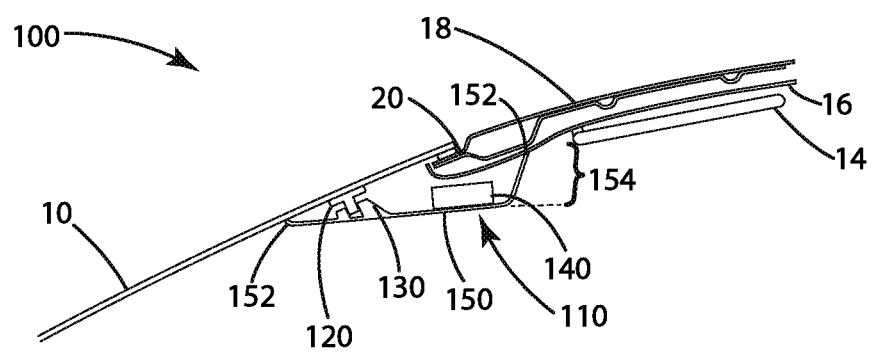
FIG. 2 shows a cross-sectional view of the lighting system in FIG. 1.

A lighting system in accordance with one embodiment is depicted in FIGS. 1-2 and generally designated 100. The lighting system 100 is attached to a window 10, which is depicted as a windshield of a vehicle—but as discussed herein, the present disclosure is not so limited. The lighting system 100 may be implemented with any type of window.

The lighting system 100 in the illustrated embodiment includes a light assembly 110 and at least one lighting attachment 120 that may be bonded to the window 10 in conjunction with an adhesive. A variety of adhesives may be utilized, including for example acrylic acid and methacrylate found in Permatex® rearview mirror adhesive. This configuration is considered more robust than a suction device or suction cup that can be removably coupled to the window via establishment of a vacuum between the suction cup and the window. The adhesive or bonding agent may be configured to provide an attachment to the window 10 that can endure in accordance with environmental exposure specifications, such as ISO-16750-4.

In an alternative embodiment, the light attachment 120 may be a carrier, similar to the light carrier 310 described herein, but without an arm and molded to an interior surface of the window 10 rather than exterior surface of the window 10. The light attachment 120 in this embodiment may define an integral shroud that substantially directs light toward an exterior of the vehicle. The light attachment 120 in this configuration may be configured to removably accept the light assembly 110, similar to the construction of the light carrier 310 to accept a light assembly.

The lighting attachment 120 may be configured to removably connect to the light assembly 110. This way, the light assembly 110 may be removably attached to the window 10.

In the illustrated embodiment, the light assembly 110 is removably attached to two lighting attachments 120 bonded to the window 10. The lighting assembly 110 in the illustrated embodiment is shown disposed in proximity to the driver-side headliner of a vehicle—but it should be understood that the lighting assembly 110 may form a light bar disposed across both the driver side and passenger side of the vehicle. Alternatively, the lighting system 100 may be implemented internally or in the vehicle cabin in conjunction with a side window of a vehicle, which can be tinted.

The at least one lighting attachment 120 may form a mountable mechanical feature on the window 10, to which the light assembly 110 may attach. This type of attachment in one embodiment may form the sole structural attachment between the light assembly 110 and the vehicle. In this way, no drilling of bracketry or fasteners for mounting to structural support elements of the vehicle (e.g., the roof 18 or A pillar or B pillar) may be involved in one version of this embodiment. And, in one embodiment, lighting system 100 may avoid removing or bending, or both, of other interior trim features such as a headliner 16 as depicted in FIG. 2.

The lighting system 100 in the illustrated embodiment may include a light element 140 and an attachment interface 130 constructed to facilitate attachment of the lighting assembly 110 to the lighting attachment 120. The attachment interface 130 in the illustrated embodiment may be integral to a shroud 150 of the lighting assembly 110 that directs light from the light element 140 through the window 10. The attachment interface 130 may include a release mechanism that facilitates attachment and removal of the attachment interface 130 to the lighting attachment 120—in one example, the release mechanism may enable attachment of the lighting assembly 110 in a concealed manner such that the shroud 150 conceals the attachment interface 130 and the lighting attachment 120. An example release mechanism is a set screw or a clip that provides friction and/or interference to hold the attachment interface 130 in position relative to the lighting attachment 120. As can be seen in the illustrated embodiment, the lighting assembly 110 may include one or more attachment interfaces 130 configured to attach respectively to one or more lighting attachments 120, which themselves are bonded to the window 10.

The lighting assembly 110 in the illustrated embodiment may include a shroud 150 or shield configured to direct light from the light element 140 through the window 10 to an exterior 2 of the vehicle. In other words, the shroud 150 may substantially prevent leakage of light from the light element 140 into an interior 4 of the vehicle. In the illustrated embodiment, the shroud 150 includes a perimeter edge 152 that substantially contacts interior portions of the vehicle interior 4 about the entire perimeter. For instance, a first portion of the perimeter edge 152 may contact the window 10 while a second portion of the perimeter edge 152 may contact structural and/or aesthetic aspects of the vehicle, such as the roof 18 and/or the headliner 16 of the vehicle. Contact between the perimeter edge 152 and interior portions of the vehicle (e.g., the window 10, structural aspects, or aesthetic aspects, or a combination thereof) may substantially prevent leakage of light from the light element 140 into the interior 4 of the vehicle.

In one embodiment, a profile 154 of the light assembly 110 with respect to the window 10 may be low (e.g., the profile may be 10 mm, possibly varying between 10 mm and 15 mm along the headliner from the left side to the right side of the vehicle) to substantially avoid obstruction of the vehicle operator's view, and possibly to reduce a potential impact space of the light assembly 110. The profile 154 may be sufficiently small as to allow substantial operation of a sunvisor 14 of the vehicle between a stored mode and visor mode in which the sunvisor 14 blocks sunlight.

The light element 140 of the light assembly may be selectively activated, and may include driver circuitry (not shown) capable of directing operation of the light element 140 in response to an external input (e.g., a discrete input or message communicated from an external source). The light element 140 in the illustrated embodiment includes light emitting diodes (LEDs) whose construction may vary depending on the application. For instance, the LEDs may be configured to a particular lumen output range and/or a particular color or set of colors. The shroud 150 in one embodiment may be configured to facilitate heat dissipation from the LEDs.

The lighting assembly 110 in the illustrated embodiment of FIG. 2 is shown in an interior configuration that is mechanically attached to the vehicle via only the window 10—thereby avoiding separate brackets to structural and/or aesthetic components of the vehicle, such as a bracket under the sun visor and/or headliner or a connection to the metal of the vehicle roof 18.

Figure 3:
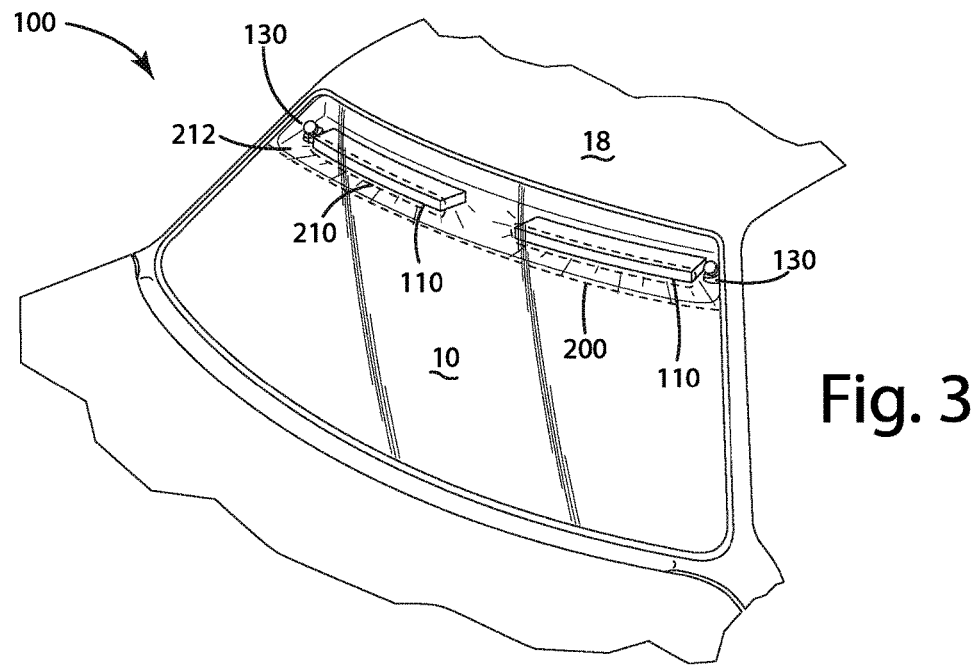
FIG. 3 depicts a perspective view of a lighting system according to one embodiment.

Turning to FIG. 3, the light system 100 is shown in an alternative configuration in which masking 200 or a shade band is applied or incorporated into the window 10 to facilitate directing light from the light element 140 and substantially preventing leakage of light into the interior 4 of the vehicle. The masking 200 may be disposed proximal to the roof 18 and configured to absorb and/or reflect external light directed toward the window 10. The shade band 200 may include one or more apertures 210 arranged to align with the one or more light assemblies 110 to enable transmission of light emitted from the one or more light assemblies 110. The masking 200 may be constructed of frit or a ceramic material bonded to the window 10 and/or an applied tint.

The masked out areas 212 around where the one or more light assemblies 110 are located may block or diminish transmission of light. Customizing the window 10 with incorporated masking 200 and light mounting features 120 allows: a highly integrated OEM look, low profile for visibility and enhanced safety, maximum or enhanced brightness, substantially unaltered color of lighting (reference SAE defined color specifications), and reduced installation vehicle damage (e.g., no drilled holes for a leased vehicle).

The construction and configuration of the lighting attachment 120 may vary from application to application. One type of attachment that may be utilized is a "button" adapted for attachment to the lighting assembly 110 to the window 10. This type of button may be utilized for mounting other components to the window 10, including a rear view mirror. However, unlike a rear view mirror configuration, the lighting attachment 120 may be modified to incorporate a purposed attachment point at a strategic location which may substantially avoid driver visibility blockage. Additionally, or alternatively, the mechanical mounting may be positioned to substantially maximize or enhance mounting for signaling and warning interior mounted lights, which are set to be located for the best or enhanced overall visibility to a wide variety of other vehicles in traffic. The mechanical bonding may be positioned to be at a maximum distance from the ground, and at the outer edges of the vehicle, including visibility from the side of the vehicle.

Figure 25:
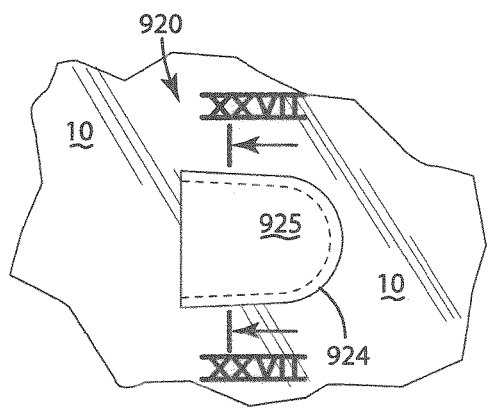
FIGS. 25-27 show various views of a lighting attachment for a window in accordance with one embodiment.
Figure 26:
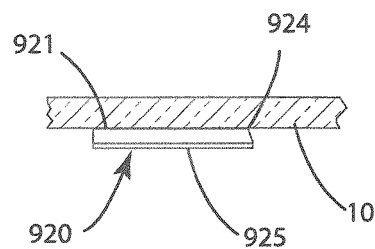
Figure 27:
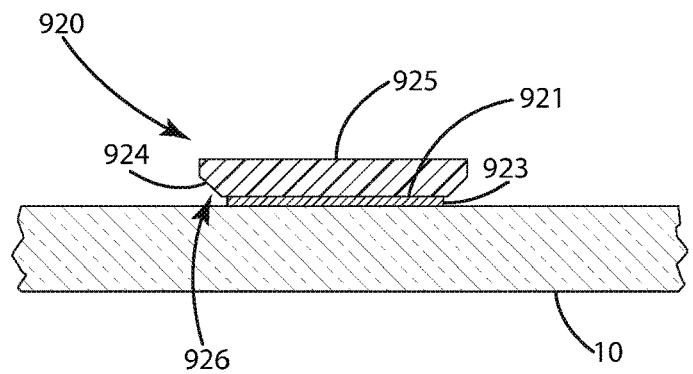

An example lighting attachment in the form of a button is shown in FIGS. 25-27 and generally designated 920. The lighting attachment 920 in the illustrated embodiments includes a window bonding surface 921, a lighting assembly engagement surface 924, and an interior surface 925. The window bonding surface 921 is constructed to adhere to a surface of the window 10 in conjunction with an adhesive 923 (or bonding agent), as described herein. The window bonding surface 921 may be substantially flat but small enough to form a bond with the curvature of the window surface in conjunction with the adhesive 923. Alternatively, the window bonding surface 921 may be curved to conform more closely to the curvature of the window surface. In one embodiment, there may be a plurality of the lighting attachments disposed at different positions on the window surface to facilitate attachment of a lighting assembly. In this way, planar and nonplanar surfaced windows may be fitted with the lighting assembly.

In the illustrated embodiment of FIGS. 25-27, the lighting assembly engagement surface 924 is constructed as a shoulder or ramp that defines a track 926 between the window 10 and interior surface 925. This track 926 enables the attachment interface 130 of the lighting assembly to slide between an outermost edge of the interior surface 925 and the window 10 and to engage the lighting assembly engagement surface 924 to remain in place. A movable projection (not shown), such as a set screw, may extend from the attachment interface 130 to engage the interior surface 925 and to thereby strengthen the engagement between the lighting assembly engagement surface 924 and the attachment interface 130.

As described herein, the lighting attachment 120 may be bonded or mechanically mounted to the window 10 in a variety of ways. In the illustrated embodiment, the adhesive 923 facilitates such bonding—but it should be understood that the present disclosure is not so limited. Any type of attachment mechanism may be utilized for mounting the lighting attachment 120 to the window 10.

The lighting attachment 120 or plurality thereof may be located in a variety of positions on the window 10. This dimensional freedom of where the lighting attachment 120 is located can be achieved in a controlled manufacturing environment. For instance, advanced optical alignment with window shadeband masking and optical path design and manufacturing process optimization can occur with fewer variations from a poorly implemented field upfit. The localized attachment provided by the lighting attachment 120 (as opposed to conventional cantilevered bracketry) may allow the light assembly 110 to seal robustly against the compound curvature of the window shape better than conventional systems. Fewer tolerances, lighter weight for the vehicle, lower profile for the assembled windshield lights according to one or more embodiments described herein may enhance safety and visibility.

Figure 28:
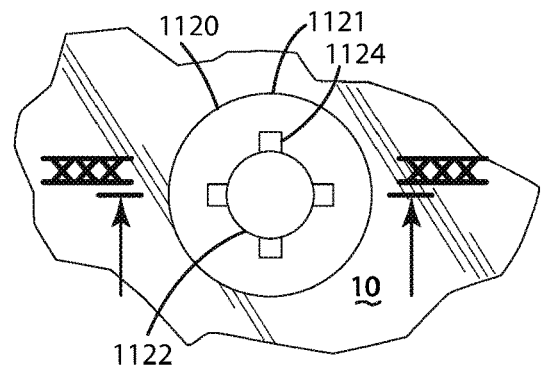
FIGS. 28-30 show various views of a lighting attachment for a window in accordance with one embodiment.
Figure 29:
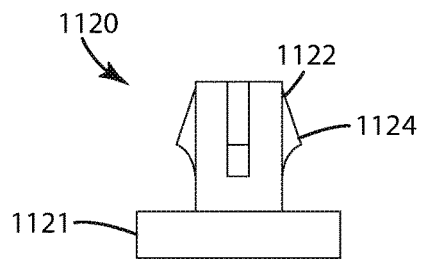
Figure 30:
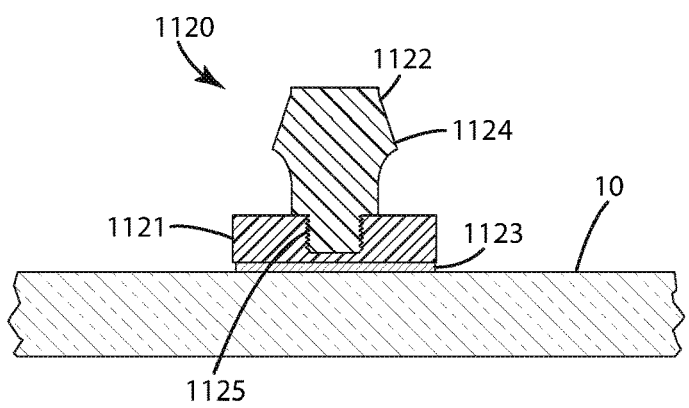

Another example lighting attachment is shown in FIGS. 28-30 and generally designated 1120. The lighting attachment 1120 in the illustrated embodiment is configured as a type of clip that can enable a snap fit engagement of the attachment interface 130. The lighting attachment 1120 includes a plurality of movable catches 124 that can function as a type of barb over which the attachment interface 130 slides but prevent easy release once engaged. The plurality of movable catches 124 may be integral to a stand 1122 that extends from a base 1121. The stand 1122 may be constructed to allow the movable catches to flex inward as the attachment interface 130 slides over the stand 1122.

The base 1121 of the lighting attachment 1120 may be bonded to the window 10 using an adhesive 1123 or other mounting mechanism for the window 10.

Optionally, the stand 1122 or clip portion of the lighting attachment 1120 is configured to capture the attachment interface 130 once the attachment interface 130 has fully engaged the stand 1122 and slide over the plurality of catches 124. In this case, to remove the attachment interface 130, a user may apply force to break one or more of the plurality of catches 124 until the attachment interface 130 is free from the lighting attachment 1120. The stand 1122 may be optionally replaceable with respect to the base 1121 via a connection 1125 (e.g., a threaded connection) so that, once broken, the stand 1122 can be replaced with a new stand 1122 for re-engagement with the attachment interface 130.

In one embodiment according to the present disclosure, the mounting arrangement may provide an alternative to use of heavy gauge metal brackets to hold lights against the windshield, where brackets may be cantilevered from where they attach to the vehicle roof structure versus where the shroud is to maintain a tight seal against the inside of the windshield glass. Often the length of conventional brackets may result in stress of maintaining a good seal of the shroud to the vehicle specific glass profile. A poor seal may result in distracting light bouncing back to the driver of the vehicle. This concern may be overcome by eliminating or reducing the stress on the cantilever brackets through use of the lighting attachment 120 in accordance with an embodiment herein.

In one embodiment, a localized attachment at the window, such as the lighting attachment 120, may enable a good seal to be achieved initially and maintained over the service life of the vehicle installation. Using bonding technology for windshield glass, a robust attachment point may be achieved. This may allow for low profile lighting, possibly extremely low profile, to integrated lighting. This low profile may improve a tall driver's visibility, keeps lighting further from the air bag deployment zone, and substantially reduces head impact possibility in event of vehicle collisions.

Because of the potential integration of the attachment point with the manufacture of the glass, custom glass options may also be combined in the solution. For example, upper windshield glass typically has a sun shade band across the entire windshield. Also, additional glass coatings known as frit material can be uniquely designed. The result of utilizing the options for this solution is that color and intensity of signal/warning lighting do not have to be degraded by attempting to project light through the default shade band or frit areas. The light attenuation may be reduced or minimized by masking the areas of signal/warning lights to have no or little filtering effect.

5. Exterior Lighting Assembly

Figure 4:
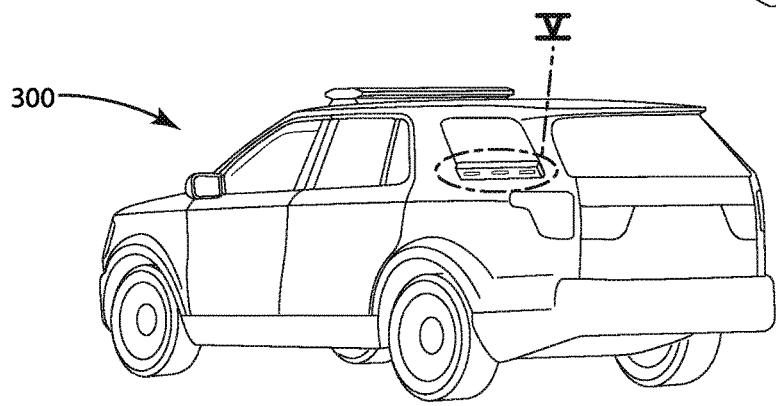
FIG. 4 depicts a perspective view of a lighting system with exterior lights for a vehicle according to one embodiment.
Figure 5:
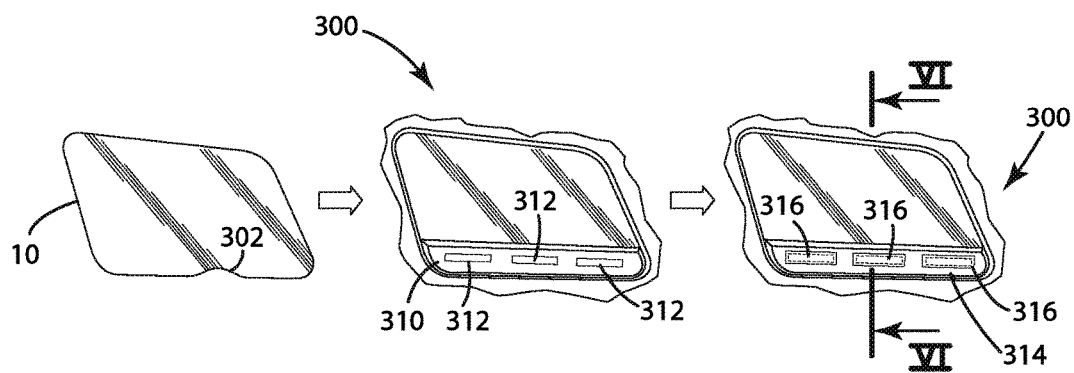
FIG. 5 shows various stages of installation or manufacture for the lighting system of FIG. 4.

The illustrated embodiment of FIGS. 4-5, a lighting system in accordance with one embodiment is shown and generally designated 300. The lighting system 300 is similar to the lighting system 100 in some respects but with several exceptions. The lighting system 300 may include one or more lighting assemblies 316 similar to the light assembly 110 but constructed to attach to a window in a different manner. The lighting system 300 may include a light carrier 310 configured to attach to the window 10—which as discussed herein may be any type of window for any type of application, including transparent or translucent glass for a vehicle.

The lighting system 300 may incorporate one or more aspects of the lighting system 100, and conversely the lighting system 100 may incorporate one or more aspects of the lighting system 300.

The lighting system 300 may facilitate attachment of one or more lighting assemblies 316 exterior to the vehicle. In the illustrated embodiment of FIG. 4, the lighting system 300 is shown in connection with a window 10 disposed between the C and D pillars of a sport utility vehicle. The light carrier 310 of lighting system 300 is bonded or attached to the window 10 to facilitate attachment of one or more lighting assemblies 316 exterior to the vehicle. Example adhesive is automotive grade pressure sensitive adhesive. The light carrier 310 may be constructed to partially or entirely encapsulate the one or more light assemblies 316 in accordance with one or more embodiments described herein.

In the illustrated embodiment of FIG. 5, the lighting system 300 is shown in connection with various stages of manufacture or installation stages from left to right. At the initial stage, according to one embodiment, the window 10 may include a relief 302 or notch that facilitates passage or routing of electrical wires from the one or more lighting assemblies 316 exterior to the vehicle into the interior 4 of the vehicle. The relief 302 may be formed in the window 10 at manufacture or post-production by removal of material from the window 10 to form the relief 302. In one embodiment, the window 10 may not include a relief 302.

The light carrier 310 of the lighting system 300 is shown attached to the window 10 in the illustrated embodiment of FIG. 5 at the middle stage. The light carrier 310 may be bonded to an exterior surface of the window 10. The bonding may be achieved with an adhesive similar to the type described in connection with the lighting system 100. The light carrier 310 may include one or more light supports 312 configured to hold a light assembly 316 in place with respect to the vehicle. The one or more light supports 312 may be formed of an opening or cavity constructed to accept the light assembly 316 and at least partially encapsulate the light assembly 316. The one or more light supports 312 may be molded pockets in one embodiment.

The light carrier 310 in addition to supporting one or more lighting assemblies 316 may optionally include heat sink capabilities and wire management features.

The manufacture or installation of the lighting system 300 may include installing the one or more light assemblies 316 on respective light supports 312, and installing the window 10 on the vehicle. The window 10 may be installed with conventional techniques, including for example use of urethane adhesive applied to a perimeter of the window 10 and bonding the adhesive to the pinch weld or a structural aperture of the vehicle that defines a window opening. In configurations that utilize a relief 302, the adhesive may be bonded to at least a portion of the light carrier 310 that extends across a thickness of the window 10 to provide a bonding surface in place of material of the window 10 that would otherwise provide such a bonding surface in a conventional configuration. This way, the window 10 in conjunction with the relief 302 and the light carrier 310 may form a substantially continuous, weather proof seal about the perimeter of the window 10 for bonding to the vehicle, despite introduction of the relief 302 into the window 10.

In the illustrated embodiment, the light carrier 310 may include an aperture or opening aligned with the relief 302 to facilitate routing of wiring from the one or more light assemblies 316 into the interior 4 of the vehicle. In one embodiment, the wiring may be routed from the exterior 2 of the vehicle to the interior 4 of the vehicle but bypasses the adhesive 26 for the window without the need to modify structural aspects of the vehicle.

In one embodiment, further exterior light examples may represent exterior lighting attached to the vehicle structure, where electrical power and control signal wire are to be routed through a mounting location (hole) or the relief 302.

In one embodiment of the lighting system 300, it may be possible to attach specialty signal lighting directly to the exterior of the window 10. A custom or customizable window assembly can be a) available at time of vehicle assembly or aftermarket vehicle modification and b) include both mechanical mounting with thermal management features and electrical power and control signal wires that pass through the window or a relief thereof. The light carrier 310 may form a mounting feature for the one or more light assemblies 316 as well as wire management for power and control signals for the one or more light assemblies 316. The light carrier 316 may be manufactured by a low pressure molding method, such as RIM (Reaction Injection Molding), and then bonded robustly to the window 10.

One embodiment according to the present disclosure may provide an alternative to use of heavy gauge metal brackets to retain the light on the exterior of the vehicle. This embodiment may be configured to withstand high vehicle speeds, car washes, and rough driving conditions to name a few challenges. The lighting system 300 may include internal metal bracketry that may serve as a heat sink for the thermal energy generated in the light.

In the lighting system 300, signal lighting may be provided in the market place, such as mPower lights, that may achieve substantially robust vehicle attachment with use of automotive grade pressure sensitive adhesive in lieu of heavy conventional brackets. Although the lighting system 300 is described in conjunction with mounting to a window 10 of the vehicle, it should be understood that the disclosure is not so limited. The lighting system 300 may be mounted to a structural panel of the vehicle, such as the vehicle roof 18. The electrical wire vehicle penetration from exterior to interior may be achieved according to one or more embodiments herein. In one embodiment, adhesive mounting may rely on the body panel metal as the heat sink.

A configuration according to one embodiment of the present disclosure may substantially addresses all or a subset of the following concerns—physical attachment, heat sinking, and exterior to interior wire management without drilling holes in the body panel. This solution may be applied to side and rear vehicle window locations, but the present disclosure is not so limited.

Figure 6:
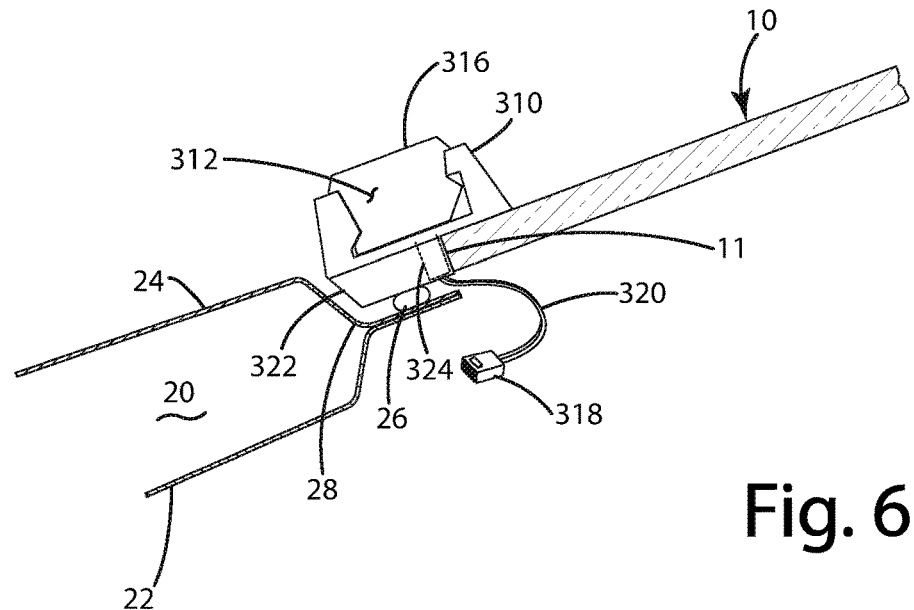
FIG. 6 depicts a cross-sectional view of the lighting system of FIG. 5.

Turning to FIG. 6, a cross section of the lighting system 300 in accordance with one embodiment is shown. The lighting system 300 in the illustrated embodiment is shown with a light assembly 316 being held by the light carrier 310. The light carrier 310 is bonded to the window 10 with the cross section being aligned with the relief 302 of the window 10 shown in FIG. 5. The light carrier 310 in this embodiment includes a leg 322 that extends over at least a portion or an entirety of the thickness 11 of the window 10. The leg 322 may fill the space defined by the relief 302 so that the leg 322 may be bonded with an adhesive 26 to the pinch weld flange 28 or structure of the vehicle.

As shown in the illustrated embodiment, the pinch weld flange 28 is defined by the outer or exterior body panel 24 and an internal panel 22 of the vehicle. The exterior body panel 24 and the internal panel 22 may be welded together, possibly spot welded at multiple locations, to form the pinch weld flange 28 to which the window 10 may be adhered to the vehicle.

The adhesive 26 as discussed herein may be a type of urethane adhesive capable of bonding the window 10 and/or the leg 322 of the light carrier 310 to the pinch weld flange 28.

In the illustrated embodiment, the light carrier 310 includes a wire routing feature 324 that enables passage of wiring 320 from the light assembly 316 to the interior 4 of the vehicle while bypassing passage across or through the adhesive 26. In some configurations, the wiring 320 may be configured to pass across or through the adhesive 26. In such configurations, attention may be provided to ensuring a weatherproof seal is established between the interior 4 and the exterior 2 of the vehicle where the wiring 320 passes across or through the adhesive 26.

The wiring 320 connected to the lighting assembly 316 may provide power as well as signal or control wires capable of directing operation of and/or receiving communication from the lighting assembly 316. The wiring 320 may be coupled to a vehicle lighting controller (not shown) and/or a vehicle power source 318.

Figure 7:
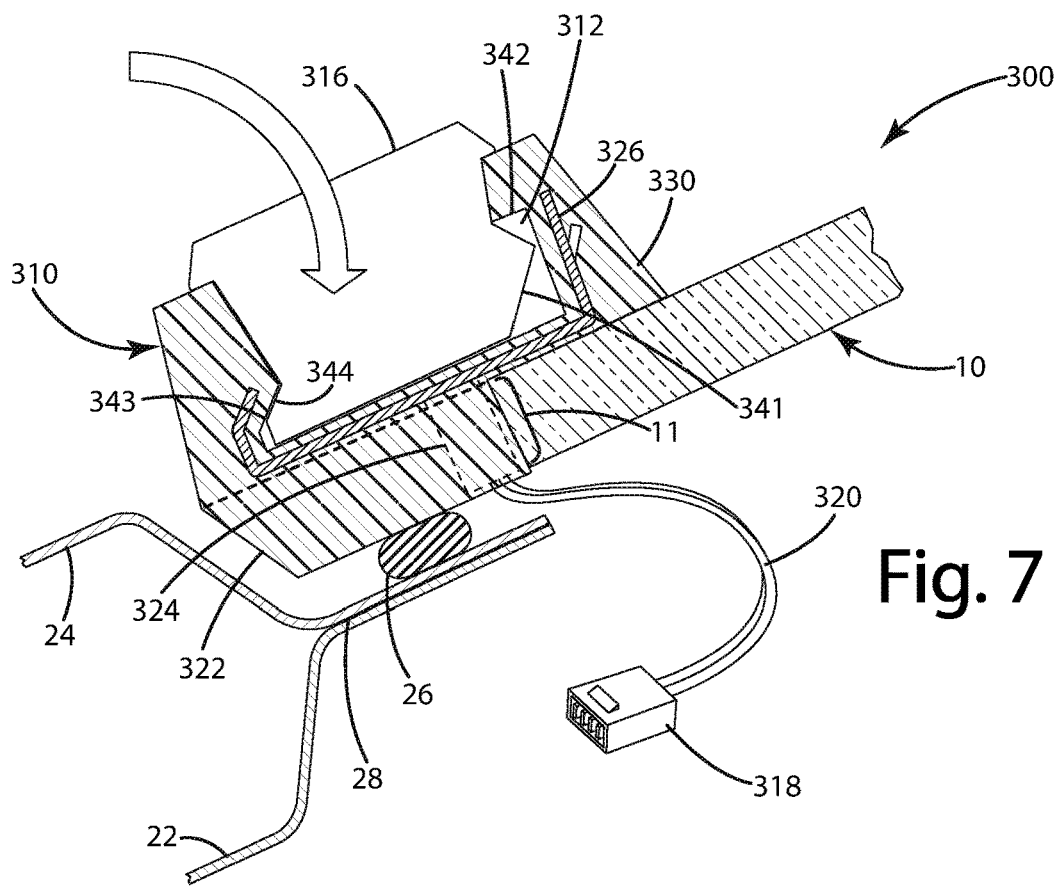
FIG. 7 depicts a cross-sectional view of an alternative embodiment of the lighting system in FIG. 6.

In the illustrated embodiment of FIG. 7, the light carrier 310 is similar to the light carrier 310 depicted and described in connection with FIG. 6 but includes an attachment bracket 326 that may be encapsulated within the light carrier 310 and facilitates maintaining the position of the light assembly 316 within the light support 312. The attachment bracket 326 may be formed of spring steel and enable releasable engagement between the light carrier 310 and the light assembly 316. The light support 312 of the light carrier 310 may include a rib 343 that extends into an internal space of the light support 312 and forms an interference fit with a foot 344 of the light assembly 316. The light assembly 316 may be positioned for insertion into the light support 312 by general alignment of the foot 344 beneath the rib 343 and then rotating the light assembly 316 until a ledge 341 of the light assembly 316 snap fits or clears a finger 342 of the light support 312. It should be understood that there may be a degree of deflection occurring in this installation process with respect to the finger 342 and/or the rib 343. The internal bracket 326 may provide additional support and strength for the light support 312, enabling repeated deflection without significant fatigue and/or supplementing structure of the light support 312 to maintain attachment with respect to the light assembly 316.

The illustrated embodiments of FIGS. 8 and 9 depict configurations of the light support 312 and the internal bracket 326. The internal bracket 326 in FIG. 8 is shown with a base 466, a first sidewall 472, and a second sidewall 462. The first sidewall includes a finger 464 configured to align with the rib 343 of the light support 312, and the second sidewall 462 is configured to provide support for the finger 342 of the light support 312. As noted herein, the internal bracket 326 may be formed of steel (e.g., spring steel), but the disclosure is not so limited. The internal bracket 326 may be formed of any type of material, the same or different from the material of the light support 312 or light carrier 310, or both.

Optionally, the internal bracket 326 may include an aperture 470 constructed to capture the ledge 341 of the light assembly 316. This may enhance securement between the light assembly 316 and the light support 312. Additionally, or alternatively, the internal bracket 326 may include a spring 468 configured to contact a lower surface of the light assembly 316 and to maintain engagement between the foot 344 and the rib 343 and between the ledge 341 and the finger 342.

In an alternative embodiment, illustrated in FIG. 9, an internal bracket is shown and generally designated 440. The internal bracket 440 is similar to the bracket 326 of FIG. 8 but with several exceptions. The internal bracket 440 includes a base 446, a first sidewall 444, and a second sidewall 442 similar to the base 466, first sidewall 462, and second sidewall 472 of the internal bracket 326. The first sidewall 444 includes a rib 452 configured to correspond with the rib 343 of the light support 312, and the second sidewall 442 includes a finger 450 configured to correspond with the finger 342 of the light support 312. This correspondence or general alignment in contour of the rib 343 and finger 342 of the light support 312 may provide additional strength to these features and facilitate capture or attachment of the light assembly 316 within the pocket of the light support 312.

Yet another alternative embodiment of the internal bracket is shown in FIG. 10 and generally designated 480. The internal bracket 480 is similar to the bracket 326 of FIG. 8 but with several exceptions. The internal bracket 480 includes a base 486, a first sidewall 484, and a second sidewall 482 similar to the base 466, first sidewall 462, and second sidewall 472 of the internal bracket 326. The first sidewall 484 includes a finger 492 and the second sidewall 482 includes a finger 490, both of which are bent or inclined inward toward the base 486 to facilitate capture of the light assembly. The internal bracket 480, as well as any of the other internal brackets described herein, may provide a thermal conduit for heat dissipation from the light assembly 420. In the illustrated embodiment, the internal bracket 480 may engage a heat sink element of the light assembly 420 (e.g., such as a heat sink element incorporated into the base element 426 of the light assembly 420). As an example, the base 486 of the internal bracket 480 may engage or contact the base element 426 to provide a thermal conduit for heat dissipation.

Figure 12:
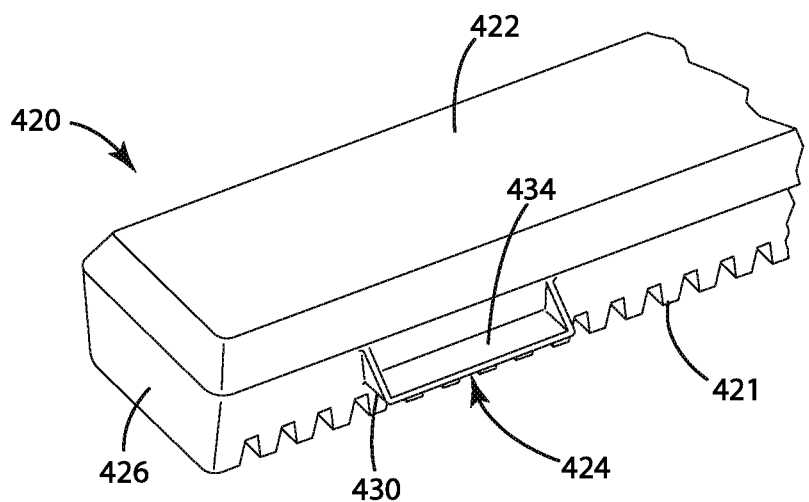
FIG. 12 shows a perspective view of a light assembly according to one embodiment.

The illustrated embodiment of FIGS. 10 and 12 depict an alternative configuration of the light assembly and is designated 420. The light assembly 420 is similar to the light assembly 316 and includes a lens 422, a base housing 426, and a catch 430. The catch 430 is constructed to facilitate engagement with a base-facing side of the finger 490 (in conjunction with the over-molding) in the installed position such that the finger 490 operates as a retainer for the catch 430. The finger 492 may likewise operate as a retainer to hold the light assembly 420 in position relative to the light support 312. The catch 434 in the illustrated embodiment may be constructed of a ledge 434 and sidewalls 430, 424 that maintain the position of the ledge 434 and may contact the interior pocket surface of the light support 312.

Optionally, as depicted in the illustrated embodiment of FIG. 12, the base housing 426 of the light assembly 420 may include one or more heat dissipation features 421 to operate as a heat sink and transfer heat generated by the light element provided in the light assembly 420.

Figure 11:
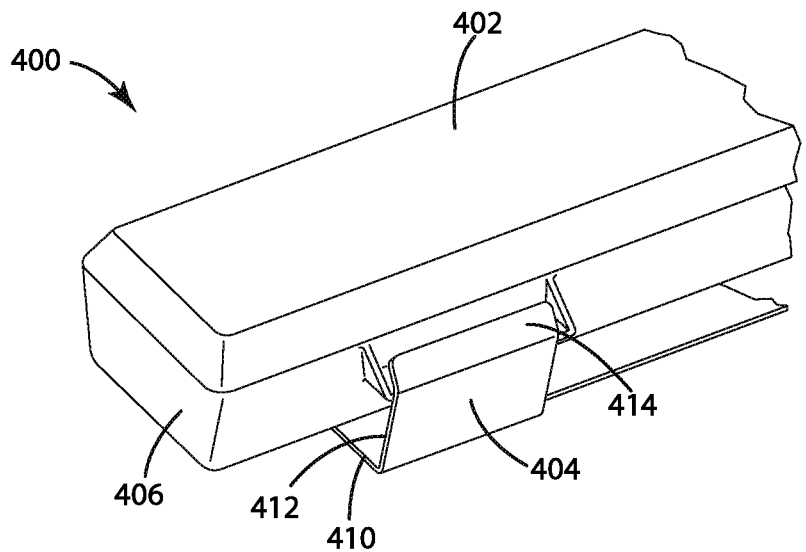
FIG. 11 shows a perspective view of a light assembly according to one embodiment.

In the illustrated embodiment of FIG. 11, a lighting assembly 400 is shown that is similar to the lighting assembly 420 but with several exceptions. The lighting assembly 400 includes a lens 402 and a base housing 406 similar to the lens 422 and the base housing 426. The lighting assembly 400 may include a catch 404 that is similar in function but constructed differently from the catch 430. The catch 404 may include a ledge 414 supported by a forward plate 412 and a bottom ledge 410. The retainer of the light support 312 may contact and hold the ledge 414 in place to maintain the position of the lighting assembly 400 in the pocket of the light support 312.

In FIGS. 16, 17, 13, and 14, various views and embodiments of a lighting system according to one embodiment are shown and generally designated 600. The lighting system 600 is similar to the lighting system 300 in many respects but with several structural differences, such as a potentially different wire routing construction. The lighting system 600 includes a light carrier 610, one or more light supports 612, and a wire routing channel 624, similar in many respects to the light carrier 310, the one or more light supports 312, and the wire routing feature 324. This way, the lighting system 600 may support one or more light assemblies 316 in respective one or more light supports 612. The light carrier 610 may be bonded to a window 10, similar to the light carrier 310.

In the illustrated embodiment, the lighting system 600 includes a wire routing channel 624 that may facilitate distribution of wiring from a wire entrance 632 to the interior 4 of the vehicle to the wire routing channel 624 to the one or more light assemblies 316. The wire routing channel 624 may extend from the wire entrance 632 through the light carrier 610 to each of the one or more light supports 612. This way, wiring 320 from each of the one or more light assemblies 316 disposed in a light support 612 may be connected to wiring internal to the vehicle. In one embodiment, the one or more light assemblies 316 may include or thermally couple with a heat sink 608. For instance, a light assembly 316 may thermally couple to metal incorporated in the light carrier 610 to facilitate routing of the wire 320 and to dissipate heat generated from the light assembly 316. As another example, the light assembly 316, as described in connection with FIG. 12, may include heat dissipation features constructed to dissipate heat into an internal space of the lighting carrier 610.

The lighting system 600 in the illustrated embodiment of FIGS. 14 and 15 is depicted with the light carrier 610 being bonded to an exterior surface of the window 10, having a leg 622 that extends across the full thickness 11 of the window 10, and having a retainer portion 623 that extends across an interior portion of the window 10. The retainer portion 623 and its extension across the interior portion of the window 10 is optional, and is not shown in the illustrated embodiments of FIGS. 16 and 17.

Figure 17:
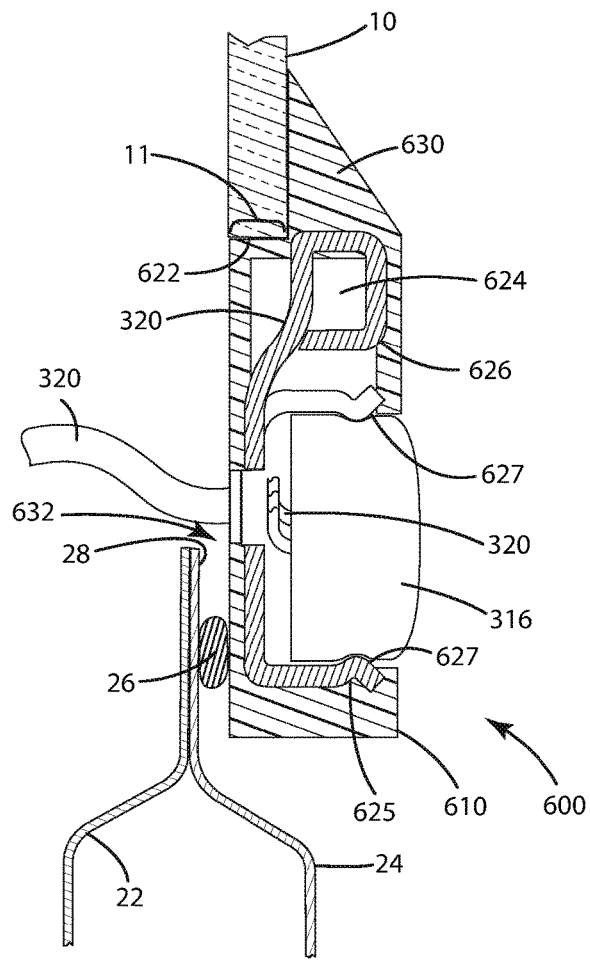
FIG. 17 shows a cross-sectional view of the lighting system in FIG. 13.

The support bracket 625 in the illustrated embodiments of FIGS. 16 and 17 is shown partially encapsulated by molded material forming the light carrier 610. The support bracket 625 includes ribs 627 arranged to retain the light assembly 316 in place through direct contact with a depression in the housing of the light assembly 316. Optionally, the ribs 627 of the support bracket 625 may be encapsulated in molded material forming the light carrier such that the ribs 627 facilitate engagement of the molded material with the depressions in the light assembly 316. The direct engagement in the illustrated embodiment may enhance heat transfer from the light assembly 316 to the support bracket 625.

The illustrated embodiments of FIGS. 16 and 17 depict the wire routing channel 624 in further detail and integrated as part of a support bracket 625, similar to the support bracket 324, that is at least partially encapsulated by the light carrier 610. The illustrated embodiments depict the light carrier 610 including molded material 630 or rim molded material constructed to bond to a perimeter, exterior surface of the window 10. This rim molded material may facilitate attachment of the light carrier 610 to the window 10.

The wire routing channel 624 formed by the support bracket 625 may provide an opening 624 through which wiring 320 of a lighting assembly 316 may pass into the wire routing channel 624. The wire routing channel 624, as noted herein, may provide an opening 623 for the wiring 320 to extend into the interior 4 of the vehicle. This opening 623 may be positioned to allow the wiring 320 to bypass the adhesive 26 that adheres the window 10 and/or the light carrier 610 to the pinch weld flange 28 of the vehicle as depicted in the illustrated embodiment of FIG. 17. The wiring 320 can be routed from an area exterior to the window to an area interior of the window 10 without needing to pass across or through the adhesive 28.

Figure 18:
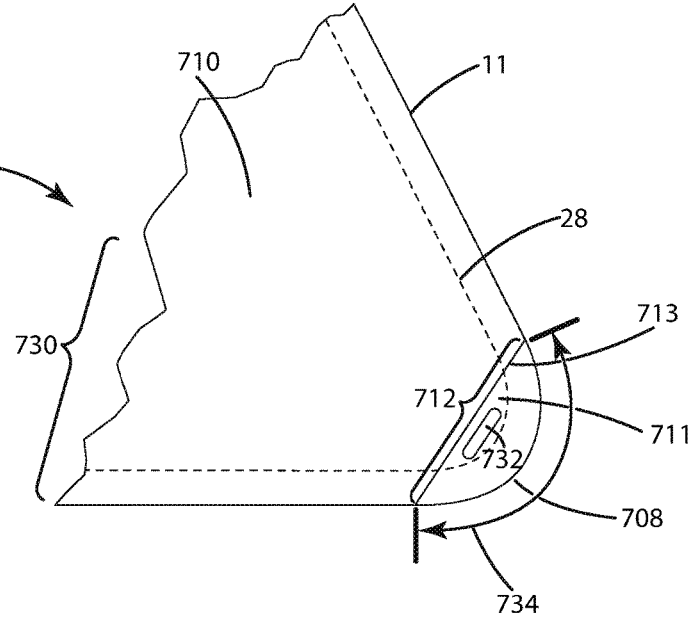
FIG. 18 shows a lighting system according to one embodiment.

FIG. 18 depicts one embodiment according to the present disclosure in which an opening 732 for wiring to bypass the window seal is disposed proximal to a corner of the window 10. The embodiment depicted in FIG. 18 includes a lighting system designated 700. The lighting system 700 is similar to the lighting system 300 in many respects but with several structural differences, such as placement of the opening 732. It should be understood that the lighting systems described herein may utilize a similarly place opening in one or more embodiments thereof.

The lighting system 700 includes a light carrier 710, one or more light supports (not shown), and a wire routing channel (not shown), similar in many respects to the light carrier 310, the one or more light supports 312, and the wire routing feature 324. This way, the lighting system 700 may support one or more light assemblies 316 in respective one or more light supports.

In the illustrated embodiment, a portion 708 of the window 10 has been removed (or is absent) so that a new edge 713 defines a perimeter of the window 10. This new edge 713 as depicted includes a portion 711 that does not overlap with the pinch weld flange 24 of the vehicle. This portion 711 may provide space for placement of the opening 732 for access to the interior 4 of the vehicle. Window engagement material 730, similar to the material 630 of the light carrier 610, may be bonded to the window 10 with an adhesive so that the light carrier 710 may remain in place relative to the window 10 and consequently the vehicle structure.

The light carrier 710 may include a portion 732 that provides a substitute surface for adhesion to the pinch weld flange 28 in place of the portion 708 of the window 10 not present. The portion 732 may include a leg that extends the full thickness of the edge 711 of the window 710 (potentially not in full or partial contact with the edge 711) to provide a substantially seamless surface for adhesion about the perimeter of the pinch weld flange 28 of the vehicle.

In many cases, non-windshield glass is made of tempered glass. Drilling a hole in the glass is not a recognized option. However, one embodiment may involve creating a low stress relief feature, for example, at or near the corner of the glass changing from a radius to a chamfer. The space created between the chamfer edge and the vehicle body metal mounting flange or pinch weld flange may allow a wire entry. In this example, the former radius corner of the glass may be replaced by the same radius shape created by the molded feature. The solid molded radius corner may include routed wire (electrical connection). This wire may be made from different materials such a flex circuit also to keep the physical electrical conductors thin and easily bendable, yet substantially withstand the RIM molding process to enable weather tight sealing.

6. Embedded Lighting

Figures 19, 20:
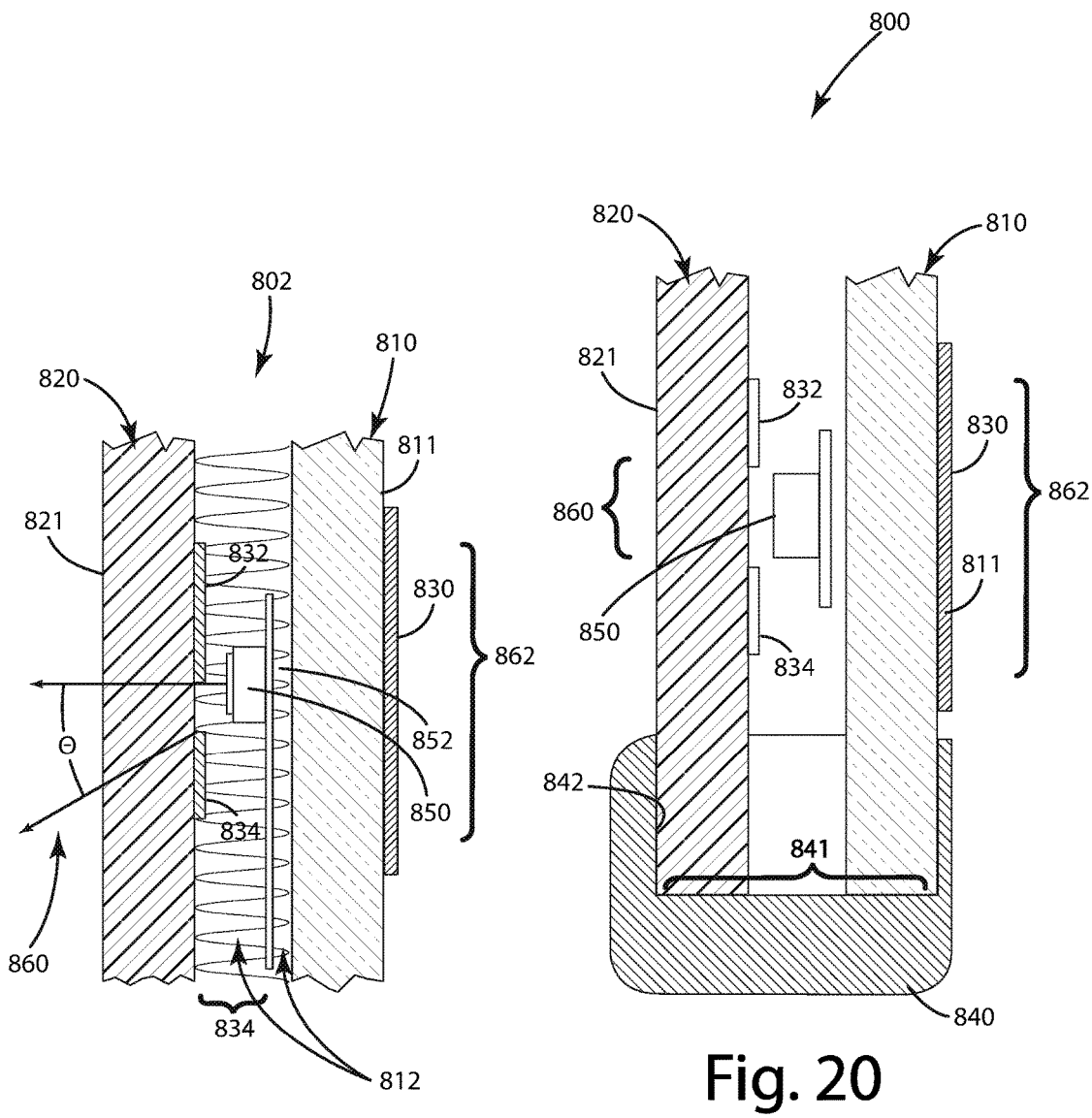
FIG. 19 depicts a lighting system integrated into a window according to one embodiment.
FIG. 20 depicts a lighting system integrated into a window according to one embodiment.
Figure 21:
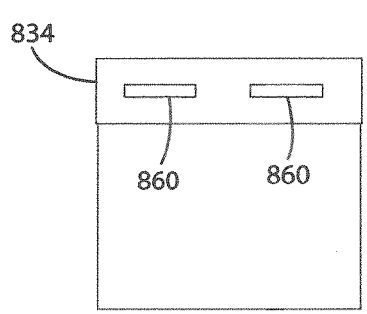
FIG. 21 shows a masking configuration for a lighting system in accordance with one embodiment.

One or more embodiments according to the present disclosure involving incorporating lighting into a window are shown in the illustrated embodiments of FIGS. 20-24. FIG. 20 depicts one embodiment of the lighting system with lights incorporated into the window and is generally designated 800.

The lighting system 800 in the illustrated embodiment includes a window 802 with an inner layer 810 and an outer layer 820. The inner and outer layers 810, 820 may be formed of glass material or other translucent or transparent materials (or any combination of such materials). The inner layer 810 may be arranged so that an exposed portion is facing an interior 4 of the vehicle, thereby providing an interior surface 811 of the inner layer 810. Conversely, the outer layer 820 may be arranged so that an exposed portion is facing an exterior 2 of the vehicle, thereby providing an exterior surface 821 of the outer layer 820.

The inner layer 810 and the outer layer 820 may be coupled together via one or more intermediate layers 812, such as one or more adhesive layers and one or more light transmissive layers similar in material construction to the inner layer 810 or outer layer 820. For instance, the window 10 may include the inner layer 810 and the outer layer 820 with an adhesive layer disposed between these two layers 810, 820.

The lighting system 800 may include one or more light elements 850, such as one or more LEDs, which may be the same or different from each other. For instance, one light element 850 may have a lower profile or different color than another light element 850. The one or more light elements 850 may be disposed between the inner layer 810 and the outer layer 820 so that the one or more light elements 850 are embedded within the window 802. During manufacture, the one or more light elements 850 may be placed so that the inner layer 810, outer layer 820 and the one or more intermediate layers 812 may form a laminated version of the window 10.

In one embodiment, the one or more light elements 850 may be electrically connected to a controller (not shown) via interface circuitry 852 embedded within the window 802. For instance, flexible circuitry may be disposed between the inner layer 810 and the outer layer 820 and arranged to provide electrical access 841 to the one or more light elements 850 from the perimeter of the window 802, such as the perimeter 840 in the illustrated embodiment of FIG. 24.

Power and/or control signals may be provided by this electrical access 841 so that, from the perimeter of the window 802, a connector 842 may be electrically coupled to the one or more light elements 850 and enable operation thereof. The interface circuitry 852 may traverse from each of the one or more light elements 850, along an area of the window 802 that is considered substantially unobtrusive to visibility (e.g., in proximity to a perimeter of the window 802 possibly in proximity to frit disposed on the window 802), and to a perimeter of the window 802 where the circuitry 852 can be exposed for connection to an external component. The circuitry 852 may terminate at the perimeter of the window 802, or at the end of a tail piece extending from the window 802.

In the illustrated embodiment, one or more masks may be disposed on the window 802, externally or internally or a combination thereof. The one or more masks may be formed of frit material, or another material capable of blocking transmission of light. The one or more masks may provide block or substantially block light emitted from the one or more light elements 850. Additionally, or alternatively, at least one of the masks may provide an aperture or define an aperture in conjunction with another mask to allow passage of light from the one or more light elements 850 in a controlled fashion (e.g., to provide the appearance of individual lights or letters).

Figure 22:
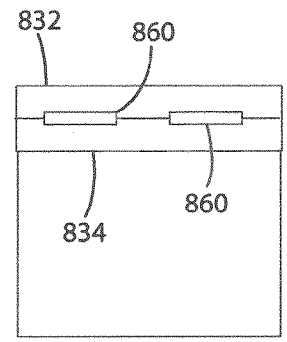
FIG. 22 shows a masking configuration for a lighting system in accordance with one embodiment.
Figure 23:
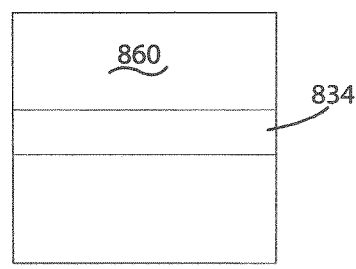
FIG. 23 shows a masking configuration for a lighting system in accordance with one embodiment.
Figure 24:
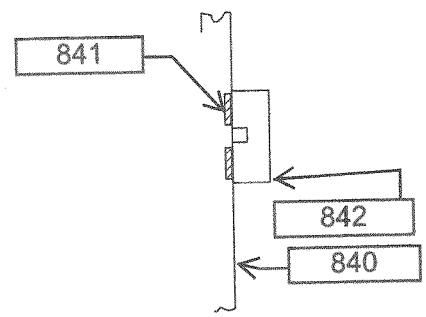
FIG. 24 shows a perimeter window electrical connection for a lighting system in accordance with one embodiment.

The one or more masks in the illustrated embodiment of FIGS. 19 and 22 include a first internally disposed mask 832 and a second internally disposed mask 834. These two masks 832, 834 in the illustrated embodiment may define an aperture 860 that allows passage of light from the light element 850. The aperture 860 may define a cone or wedge of light dispersion from the light element 850 with a spread angle θ (which can vary from application to application). In one embodiment, the aperture 860 may be offset relative to the light element 850 (e.g., off centered relative to the center of the aperture 860 and the center of the light element 850) to affect a direction of the cone or wedge of light dispersion. It should be understood that the two masks 832, 834 may be formed by a single mask with an opening defining the aperture 860 as depicted in the illustrated embodiment of FIG. 22, or the opening may be defined between a mask and a structural portion of the vehicle as depicted in the illustrated embodiment of FIG. 23.

In the illustrated embodiment of FIG. 19, a mask 830 may be provided to substantially block light from exiting the window 802 in proximity to the mask 830. In this case, the mask 830 is disposed in an interior 4 of the vehicle to prevent leakage of light therein, potentially distracting an operator of the vehicle. This way, the mask 830 may provide a light shield 862 for the interior 4 of the vehicle. The masks 832, 834 may be configured to absorb light from the light element 850 to substantially avoid reflecting the light back into the interior 4 of the vehicle.

In the illustrated embodiment of FIG. 20, the lighting system 800 optionally includes a perimeter member 840 that may include a leg 841 that extends across the thickness of the window 802 and across a portion of the exterior surface 821. The perimeter member 840 may be similar in many respects to the light carrier described in connection with several embodiments herein, and may be bonded to the window 802 in a similar manner.

The vehicle window 802 in one embodiment may be a combination of laminated layers of material (e.g., glass), including the outer layer 820 and the inner layer 810. The material or an intermediate adhesive layer that holds the laminated layers 810, 820 together may have a substantially fixed thickness, for example 0.6 mm thick. One embodiment may involve insertion of an equivalent thickness of circuitry with LEDs (considered thin), and then apply the lamination process. The result is a piece of vehicle window 802 with embedded LED lights.

In one embodiment, this configuration may further involve optional removal of glass tint and providing one or more masks or shade banding at specified areas to enable maximum or enhanced brightness signal lights. Further, in one embodiment, selective printing of opaque material as a mask may be utilized so as to not allow or substantially prevent LED light inter-reflection to enter back into the passenger compartment and thus avoid substantial distraction of the driver. The printed opaque material may be added to one or more glass elements in the lamination stack. One embodiment may achieve controlled output light aperturing on the outer most layer of glass, while substantially eliminating backward reflected light on the inner most layer of glass.

The LEDs in the sandwiched or laminated configuration may be used for signal lighting with colors specified by SAE, FMVSS. The LEDs may also be arranged to provide key messaging (human readable visible, machine readable non-visible). The messaging may contain text characters or combine in combination to create patterns.

One embodiment according to the present disclosure may benefit from alternate use of multi-layer laminated glass. The federal vehicle standards dictate glass requirements for safety. The windshield in most cases has a different composition from side and rear glass.

The inner or intermediate 812 layer for lamination of the inner and outer layers 810, 820 can utilize materials such as polyvinyl butyral (PVB). LEDs may be disposed within the inner layer, by use of conductive polymer. For special purpose vehicles, the power requirements for light output may involve higher current traces for both electrical current flow to the LED, as well as thermal energy dissipation.

As modern vehicles have compound curvature, incorporating LED lights that have controlled optical output may involve different techniques. The application of opaque or substantially opaque material to selected glass sides within the lamination may achieve a desired result. The opaque material may become a light output limiting aperture when designed to correspond with individual LEDs. The opaque material may be electrically conductive or non-conductive (possibly for providing power to the LEDs), and optically reflective or absorptive. Combinations of these properties may be selected for specific effect.

One example is to utilize absorptive aperture material on the exterior layer 820 (to substantially avoid directed back reflection toward the driver), then also use absorptive material to visually provide occlusion of the LED point of light, which also includes resultant inner reflection of outwardly pointed LED light bounced back by the first and second optical surface of the outermost layer 820.

The opaque material may be composed of frit material, which is a ceramic based material. This process can be selectively placed by a masking process. The purpose of the frit is often to create a porous bonding surface for attachment of glass to a vehicle body. Frit material also can be utilized to help dissipate thermal energy, such as adjacent usage around high power LED components laminated between two or more layers of glass.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which exclusive property or privilege is claimed are defined as follows:

1. A lighting system for mounting a light assembly to a window of a vehicle, the lighting system comprising:
   a lighting attachment separable from the light assembly, said lighting attachment having an attachment surface constructed to be substantially bonded and/or molded to the window, said lighting attachment having a light assembly interface that removably connects with said light assembly in an interior of the vehicle;
   said light assembly configured to removably connect with said light assembly interface of said lighting attachment, said light assembly having a light element that generates light in response to application of power to the light element;
   a shroud that substantially shields the interior of the vehicle from light output from the light element; and
   wherein an edge surface of said shroud interfaces with the window to substantially prevent direct leakage of light output from the light element into the interior of the vehicle, whereby light output from the light element and resulting reflected light indirectly enters the interior of the vehicle.

2. The lighting system of claim 1 wherein the light assembly includes the shroud.

3. The lighting system of claim 1 wherein said lighting attachment is configured to be substantially bonded to the window in conjunction with an adhesive.

4. The lighting system of claim 1 wherein a headliner edge surface of said shroud interfaces with a headliner of the interior of the vehicle so that, in conjunction with said edge surface, an entire perimeter edge of said shroud substantially prevents direct leakage of light from the light element into the interior of the vehicle.

5. The lighting system of claim 1 wherein said shroud substantially shields said lighting attachment from view within the interior of the vehicle.

6. The lighting system of claim 1 wherein said light assembly is held in place solely by coupling to the window via at least one of said lighting attachment.

7. The lighting system of claim 1 wherein said lighting attachment includes a plurality of buttons, each of said plurality of buttons including a lighting assembly engagement surface, wherein said plurality of buttons engage a plurality of plurality of attachment interfaces for a planar or nonplanar window.

8. The lighting system of claim 7 wherein said plurality of attachment interfaces are formed in said shroud.

9. The lighting system of claim 1 wherein the window includes one or more masked areas aligned with the light assembly to facilitate transmission of light output from the light element.

* * * * *